Patented June 3, 1941

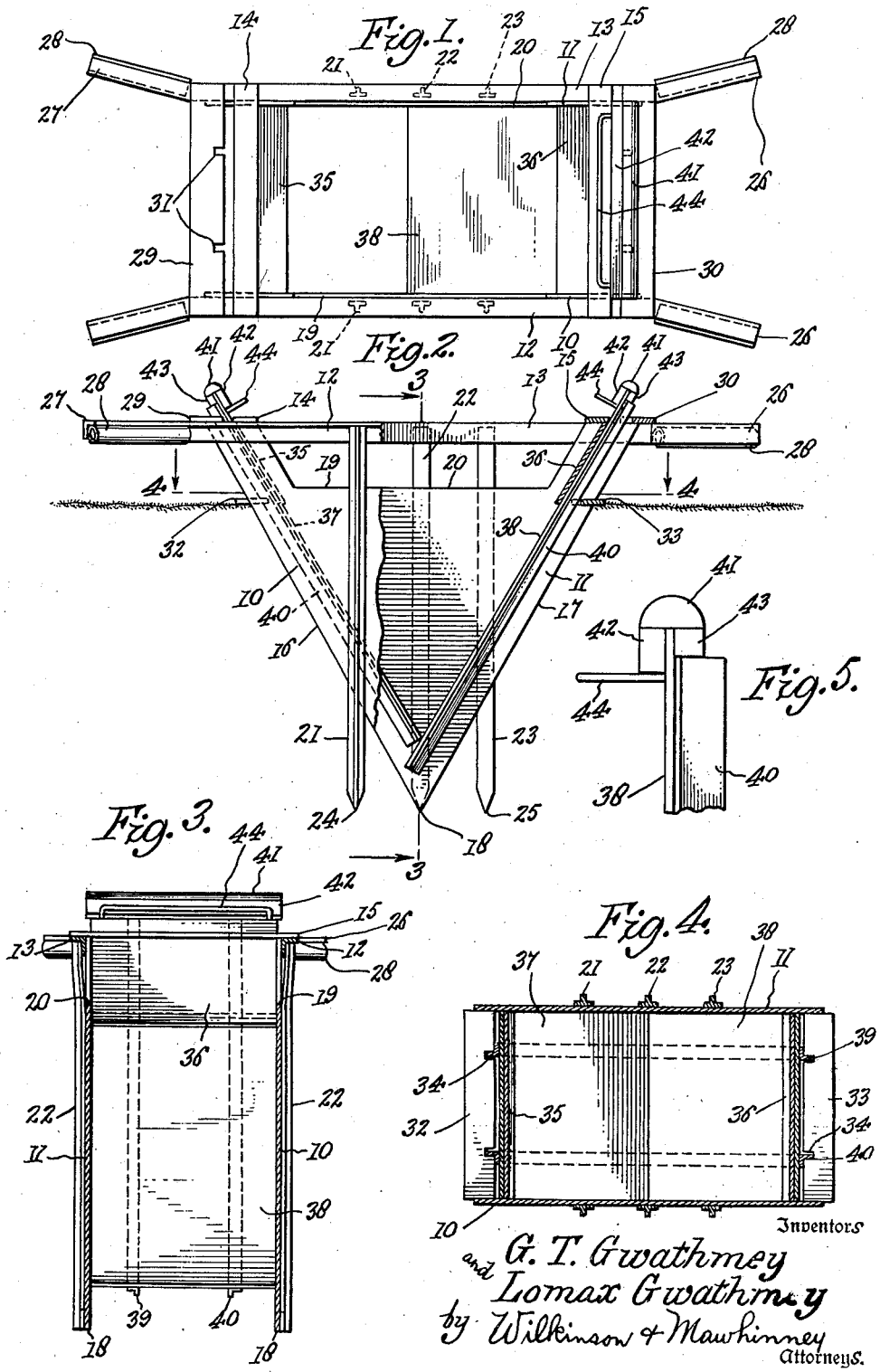

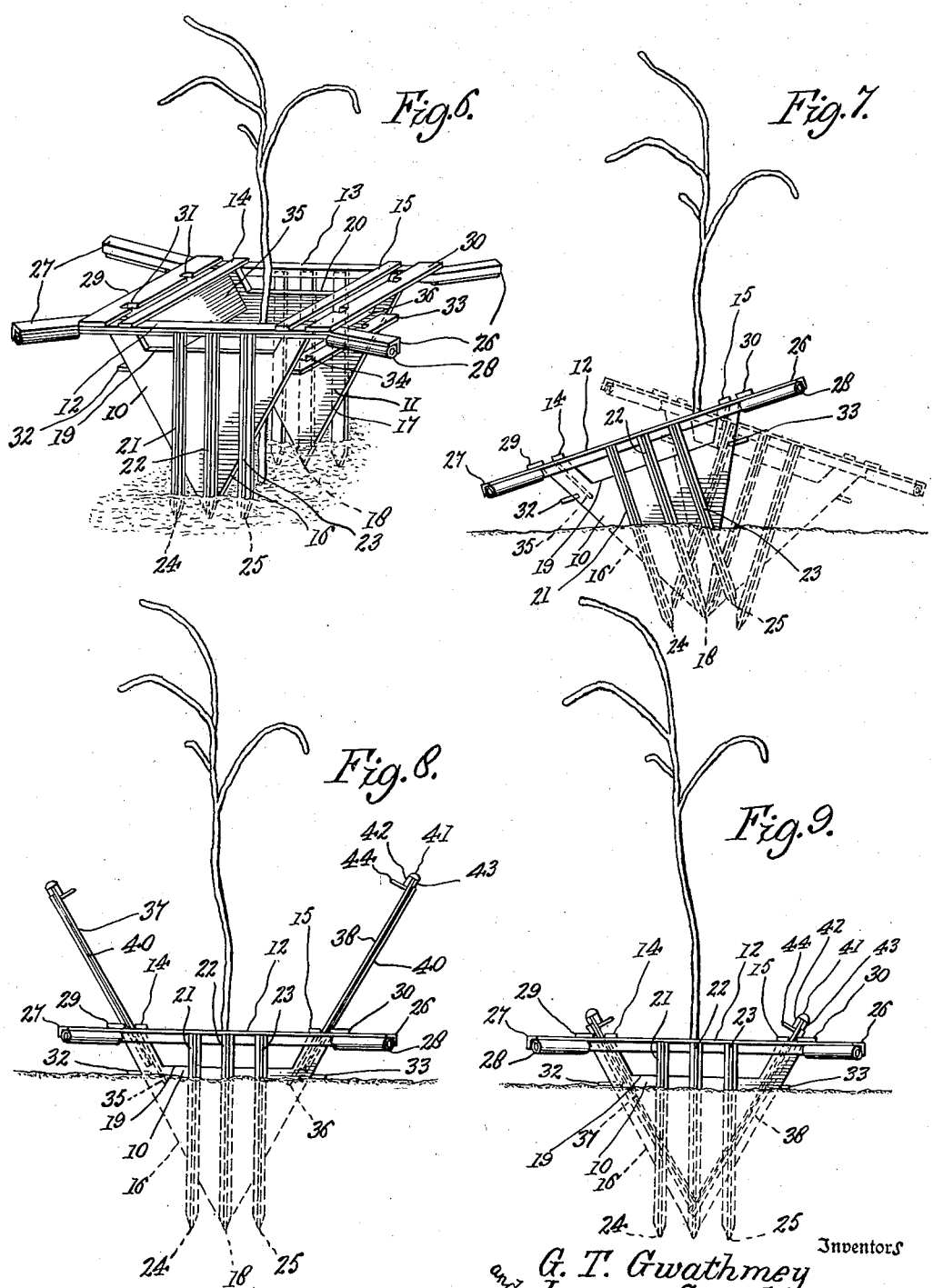

2,243,955

UNITED STATES PATENT OFFICE 2,243,955

TREE TRANSPLANTER

George Tayloe Gwathmey, Orlando, and Lomax Gwathmey, Apopka, Fla.

Application June 10, 1940, Serial No. 339,796

10 Claims. (Cl. 47—37)

The present invention relates to improvements in tree transplanters, and has for an object to provide a simple form of device which will admit of easy penetration into the ground in order to isolate the roots of the tree to be transplanted together with a sufficient amount of supporting earth, and to enable the isolated tree to be conveniently and quickly removed to another locality, and there to admit of the expeditious transplanting of the tree and the freeing of the device rapidly and completely from the same.

Another object of the invention is to provide a tree transplanter which exists initially in a skeleton form in which it offers little opposition or interference to being driven into the earth, and which is completed by removable members constructed and arranged to form with such skeleton a complete enclosure, the members admitting of being driven into the earth after the skeleton device has been placed in situ.

A further object of the invention is to provide a cooperating frame and side walls so constructed that by rocking the frame and at the same time imposing a suitable amount of weight thereon the side walls may be readily made to penetrate into the ground a suitable distance in combination with end walls which are initially removed from the frame and are thereafter driven into the ground to form an enclosure with the side walls.

The invention further contemplates the provision of an improved device which will conserve the time of nurserymen and enable the rapid transplanting of trees without danger of destruction thereto.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a top plan view of an improved tree transplanter constructed in accordance with the present invention.

Figure 2 is a side view thereof with parts broken away and parts shown in section.

Figure 3 is a vertical section taken on the line 3—3 in Figure 2.

Figure 4 is a horizontal section taken on the line 4—4 in Figure 2.

Figure 5 is a fragmentary side view of the upper portion of one of the removable end walls showing the method of reinforcement.

Figure 6 is a perspective view of the device in its skeleton form shown in the initial phase of application.

Figure 7 is a side view of the device showing a second phase in its application and indicating the rocking method of penetration.

Figure 8 is a similar view showing the skeleton device as driven home in the ground with the removable end walls initially in place, and Figure 9 is also a side elevation showing the completed device in its final position with the end walls driven in place.

Referring more particularly to the drawings 10 and 11 designate fixed side plates or walls held in spaced apart relation by an appropriate frame. This frame consists generally of the side rails 11 and 13 held in rectangular arrangement by cross bars 14 and 15. The parts are preferably of metal secured together in any desired manner preferably by welding.

The side walls 10 and 11 are relatively thin to facilitate penetration into the ground. For this purpose such side walls are also preferably V-shaped or triangular in form with downwardly convergent edges 16 and 17 meeting in apex points 18.

The upper wider portions of the side walls 10 and 11 are preferably formed with cut-away portions 19 and 20.

The side rails 12 and 13 may be angled in cross section, as indicated in Figure 3, with the upper portions of the side walls 10 and 11 overlapped with and fitted against the inside faces of the vertical webs thereof and welded or otherwise secured thereto. The side plates or walls 10 and 11 are also reinforced by T-shaped, or other shaped, reinforcing and stiffening members 21, 22 and 23 in any suitable number. As shown in the single embodiment of the invention illustrated in the drawings, three such members are employed.

As seen in Figure 4, the base portions of the members are designed to lie flat against the exterior faces of the side walls 10 and 11 to which the same may be welded.

As shown in Figure 3 the upper ends of these members 21, 22 and 23 are offset slightly outward so as to overlap and engage the outside faces of the vertical webs of the angle iron side rails 12 and 13 to which said members may be affixed as by welding. The reinforcing or stiffening members 21, 22 and 23 are substantially parallel to one another and are preferably vertically arranged with the intermediate member 22 coinciding substantially with the apex points 18 of the side walls 10 and 11. The lower end of this intermediate member 22 is sharpened or formed like a prong and it conforms generally to the convergent lower edges 16 and 17 of the side walls. Therefore this lower pronged end of the member 22 reinforces and strengthens the side wall at its weakest point 18. The two side members 21 and 23 project below the convergent edges 16 and 17 and form independent prongs 24 and 25 for entering the ground at opposite sides of the apex points 18.

Pairs of handles 26 and 27 at the ends of the frame may be conveniently supplied by extensions of the side rails 12 and 13, the same being preferably spread apart or turned outwardly and reinforced and made smooth to the hand by the cylindrical grips 28 welded or otherwise secured to the vertical and horizontal webs of the angle iron of which the handles are formed. It is obvious that the handles may be otherwise constructed.

Carried by the side rails 12 and 13 outwardly of the cross bars 14 and 15 are guide bars 29 and 30 having in their inner edges guideways or guide notches 31. Below such guide bars 29 and 30 are gauge bars 32 and 33 extending across between the side walls 10 and 11 and welded or otherwise secured thereto, such gauge bars also having notches 34 in alinement or registry with the notches 31.

As best seen in Figure 2 the gauge bars 32 and 33 are set inwardly from the respective guide bars 29 and 30. Guide plates 35 and 36 extend down from the outer edges of the cross bars 14 and 15 in convergent relation and are welded or otherwise secured to said cross bars, to the side walls 10 and 11 and also to the rails 12 and 13 if desired. The guide bars 29 and 30 are spaced outwardly from the cross bars 14 and 15 and form guideways therebetween to receive the removable end walls 37 and 38. This guideway is in effect continued by the plates 35 in combination with the gauge plates 32 at one end of the frame and by the plates 36 and the gauge bar 33 at the other end of the frame. This construction forms two guideways which are mutually convergent downwardly at the end portions of the frame to receive the removable end walls 37 and 38 which are substantially rectangular in construction. One of these end walls 38 is longer than the other as indicated in Figure 2 so that the two end walls may be overlapped at their lower ends to form the complete enclosure with the side walls 10 and 11.

The end walls 37 and 38 are also preferably reinforced and stiffened by angle irons or other members 39 and 40 which are slidably received in the notches 31 and 34. This arrangement serves to guide the end walls down uniformly and prevents the same from getting out of alinement or jamming. The upper edges of the end walls 37 and 38 are reinforced to receive the blows of a mallet. For this purpose heads 41 or head strips extend along the upper edges of the end walls overlapping at opposite sides thereof and resting in part against the reinforcing bars 42 and 43 which may be welded both to the head strip 41 and to opposite sides of the end wall.

The bar 43 is also in abutting relation with the upper ends of the reinforcing members 39 and 40 and welds may be made at such junction points. Handles 44 are attached to the removable end wall and preferably just beneath and to the inner reinforcing bars 42 in order that the handles may project inwardly which in effect tilt such handles upwardly as will be appreciated from an inspection of Figure 2.

Thus the handles are more easily accessible. The attachment of the handles to the reinforced head construction tends to prevent distortion of the end walls when the handles 44 are pulled up upon.

In the use of the device, the skeleton form of the device is initially placed over the tree in the position indicated in Figure 6. By the skeleton form of the device is meant the device with the end walls 37 and 38 removed. This will facilitate the penetration of the side walls 10 and 11 into the ground and it will not interfere with the rocking movement of the device from one end to the other as indicated by the full and dotted lines in Figure 7. This rocking movement is accomplished by two operatives one at each end of the device grasping the handles 26 and 27 and alternately see-sawing or bearing their weight upon said handles.

The V-shaped or triangular construction of the side walls 10 and 11 is favorable to this see-sawing or rocking motion and the convergent edges 16 and 17 and the apex points 18 not only facilitate direct penetration but form effective fulcrum points upon which this rocking motion may be most easily achieved with the thin convergent edges 16 and 17 sawing through the ground incident to the motion given. The prongs 24 and 25 are also driven down by this alternate see-sawing motion and tend to penetrate and to rip out the ground and to facilitate the entering wedge action.

This see-sawing motion is continued with the impression of weight until the device arrives at the position shown in Figure 8 where the gauge bars 32 and 33 have both contacted the ground line thus substantially preventing the further penetration and indicating to the operators the correct final home position in the ground. The end walls 37 and 38 are then placed in the guideways. A mallet or other implement being used these end walls are driven down through the guideways and into the ground with their ends finally taking up the overlapped relation indicated in Figure 2.

As shown in Figure 2 the side and end walls form a complete enclosure for the roots and the sustaining earth about the roots and such roots and earth are isolated by the action of penetration of the side and end walls so that when the end walls are driven home as indicated in Figure 9 the two nurserymen may lift up upon the handles 26 and 27 and convey the tree to the new location. At such new location the device in the condition shown in Figure 9 may be lowered into the hole dug in preparation for the same.

By withdrawing the end walls 37 and 38, utilizing the handles 44 for the purpose, the device will be reconverted to skeleton form and may be readily lifted from the ground leaving the transplanted tree with its root and supporting earth in its new location.

It is obvious that various changes and modifications may be made in the details of construction and design of the above specifically described embodiment of this invention without departing from the spirit thereof, such changes and modifications being restricted only by the scope of the following claims.

What is claimed is:

1. An improved tree transplanter comprising side rails, divergent pairs of handles extending from the ends of said rails, cross bars for securing said rails in spaced relation, substantially triangular thin side walls carried in substantially parallel relation to one another by said rails, guide plates extending convergently down from said cross bars between said plates and attached thereto, guide bars carried by said rails spaced outwardly of said cross bars, gauge bars extending across and attached to said side plates below and set inwardly from said guide bars, said gauge bars and guide bars forming with said plates downwardly convergent guideways at opposite end portions of the frame, and removable substantially rectangular end walls insertable freely through said guideways and adapted to form with the side walls a complete enclosure.

2. An improved tree transplanter comprising side and end members secured together to form a frame, relatively thin side plates secured to said frame, reinforcing members secured to said side members and to said side walls and having lower pronged ends, and end walls removably associated with said side walls to form an enclosure.

3. An improved tree transplanter comprising a substantially rectangular frame, side walls carried thereby, guides at the end portions of the frame, end walls removably driven through said guides to associate themselves with the side walls to form an enclosure, heads on said end walls, reinforcing members beneath said heads and attached to opposite sides of said end walls, handles on the end walls associated with one of said members, and stiffening means on the side walls associated with another of said members.

4. A tree transplanter comprising a substantially rectangular open frame, side walls depending from said frame in substantially parallel relation to each other, each side wall having downwardly convergent side edges to facilitate penetration into the ground on a rocking motion of the frame in the parallel planes of said side walls, means on the frame adapted to cause rocking motion of said frame and connected parallel side walls, removable end walls initially removed and adapted to be driven into the ground after penetration of said parallel side walls, said end walls being of substantially rectangular form, and guide means on the end portions of the frame for guiding said end walls downwardly along the convergent edges of said parallel side walls.

5. A tree transplanter comprising spaced and substantially parallel side walls of approximately V-shaped formation with the apex portions thereof directed downwardly for penetration into the ground, a frame having side portions connected to said side walls at the upper portions of the side walls, said frame also having end portions, guide means at the end portions of said frame arranged in a direction generally in line with the convergent lines of the edges of the V-shaped parallel side walls, substantially rectangular end walls removably mounted in the frame and adapted to be driven through said guide means, and handles on said frame for imposing weight and rocking motion on the frame when the end walls are removed.

6. A tree transplanter comprising a frame having sides and ends, means connected to said frame for subjecting the frame to weight and rocking motion in an endwise direction, substantially rectangular end walls removably associated with the end portions of the frame, guide means on the end portions of the frame to direct said rectangular end walls convergently down below the frame and with their lower edges into a substantially overlapping relative position, and substantially parallel spaced side walls carried fixedly by the side portions of the frame and having downwardly convergent edges to see-saw down into the ground as said frame and parallel side walls are rocked back and forth previous to the insertion of said end walls.

7. A tree transplanter comprising a frame having sides and ends, initially removed removable end walls insertable downwardly through the end portions of the frame in convergent relation, means to rock the frame from end to end, and substantially parallel side walls carried rigidly by the sides of said frame and having downwardly convergent edges for see-sawing into the ground during the rocking motion of said frame previous to the insertion of said removable end walls.

8. A tree transplanter comprising a frame having side and end portions and being open substantially vertically therethrough, inclined guide means in the end portions of the frame converging downwardly, removable end walls substantially rectangular in form removably received downwardly through said guide means after insertion of the device in the ground, substantially thin side walls carried fixedly by the side portions of said frame and having downwardly convergent side edges adapted to see-saw into the ground on rocking motion of said frame from end to end, and means for causing such rocking motion of the frame.

9. A tree transplanter comprising an open frame having side and end portions, spaced substantially parallel side walls fixed to the side portions of said frame and projecting downwardly therefrom and having convergent edges, means for rocking said frame in the planes of said side walls to cause penetration of the side walls into the ground, gauge means for determining the extent of the penetration positioned to engage the ground, guide means at the end portions of the frame, and removable end walls adapted to be driven into the ground through said guide means after the device has been inserted in the ground, said end walls adapted to overlap beneath apex portions of the edges of the parallel side walls and to extend in a line from one apex portion to the other of the two substantially parallel side walls.

10. A tree transplanter comprising an open frame having side and end portions, initially removed removable end walls insertable through the end portions of the frame, means to rock the frame from end to end, substantially parallel spaced apart side walls on the side portions of the frame having downwardly convergent edges, and prongs on the side walls extending beyond such convergent edges to rip the ground on the rocking motion of the frame and rigidly connected side walls.

GEORGE TAYLOE GWATHMEY.
LOMAX GWATHMEY.